United States Patent Office 3,328,557
Patented June 27, 1967

3,328,557
NICKEL ARC WELDING ELECTRODE
Charles E. Rogers, Bayside, and Joseph F. Quaas, Island Park, N.Y., assignors to Eutectic Welding Alloys Corporation, Flushing, N.Y., a corporation of New York
No Drawing. Filed Jan. 9, 1964, Ser. No. 336,636
6 Claims. (Cl. 219—146)

This invention relates to the process of open arc welding, and to the application of commercially pure nickel to compatible base metals by the open arc welding process.

Heretofore the application of nickel by arc welding has been accomplished under full covering slag either by using manual flux coated electrodes, or by automatic welding under the protective cover of fused or bonded fluxes, or as in some automatic and semi-automatic procedures under the protection of inert gases which provide a shield against the oxidizing influence of the atmosphere.

Nickel, being a highly oxidizable element, requires protection against atmospheric oxygen which combines with the nickel at a very fast rate especially at the elevated temperatures used in the electric arc process. The formation of nickel oxide during the welding process results in poorly formed beads and imperfect fusion accompanied by minute to large porosity in the weld.

The use of shielding materials for the purpose of avoiding oxidation in the conventional methods of welding is not only an added expense but very often requires additional equipment for the storage and feeding of the protective materials into the welding zone limiting the mobility of automatic or semi-automatic processes.

While manual electrodes can be suitably provided with a flux coating which in turn melts in the arc stream and solidifies as a slag protecting the weld deposit, such a covering is not available to automatic or semi-automatic wires used for open arc welding because of the necessity for maintaining a metallic surface which becomes a contact through which the electric circuit is completed. The use of tubular electrodes whereby a continuous tube is formed from nickel strip and which during the forming stage is filled with a suitable combination of metals and fluxing materials provides a continuous wire with contact surfaces clean and exposed for the passage of electric currents has been found to produce satisfactory welds when shielded by an inert gas.

However, due to the bulk density of the usual electrode fluxes or minerals, the amount of material which may be incorporated within the tubular wire is small and therefore presents certain limitations as to the volume of slag supplied to cover the deposit, which has made it necessary to supplement them by welding in an inert gas atmosphere.

An object of this invention is to provide a tubular nickel arc welding electrode incorporating a minor amount of fluxing constituents that operates efficiently in an open arc welding process.

In accordance with this invention a tubular electrode for open arc welding includes a thin tube of nickel having a wall thickness ranging approximately from 0.012 to 0.020 inch and filler alloying agents and filler fluxing agents within said tube. The nickel content of the combined filler alloying agents and tube are approximately from 97.4 to 98.7% by weight thereof. The nickel tube ranges from 54–62% by weight of a cross sectional unit of said combined filler alloying agents and nickel tube. The filler alloying agents range from 38–46% by weight of said cross sectional unit. The composition of the filler alloying agents consist essentially of the following constituents in the indicated ranges of percentages by weight of said combined filler alloying agents and tube.

| Constituents: | Percent by weight |
|---|---|
| Carbon | 0.70–1.10 |
| Silicon as ferrosilicon | 0.15–0.40 |
| Manganese as ferromanganese | 0.25–0.50 |
| Iron as above ferroalloys | 0.20–0.60 |
| Nickel | Balance |

Filler fluxing agents compatible with said electrode and applied parent metals ranging approximately from 0.5–6% by weight of the overall electrode are also inserted within the tube, and the combined filler alloying agents and tube range approximately from 94–99.5% by weight of said overall electrode. Expressed differently the tubular electrode of the instant invention may be represented as follows:

| Material | Weight Percents | | |
|---|---|---|---|
| Nickel tube (wall thickness 0.012 to 0.020″) | 94–99.5 | 54–62 | Carbon 0.70–1.10<br>Silicon 0.15–0.40<br>Manganese 0.25–0.50<br>Iron 0.20–0.60<br>Nickel 97.4–98.7 |
| Filler alloying agents | | 38–46 | |
| Filler fluxing agents | 0.5–6 | | |

A particular example of filler alloying agents to be incorporated in the nickel tube and one which will produce the purest quality of nickel deposited is formulated as follows in percentages by weight of combined filler alloying agents and tube:

| | Percent |
|---|---|
| Carbon or graphite | 0.90 |
| Silicon as ferrosilicon | 0.20 |
| Manganese as ferromanganese | 0.30 |
| Iron as above ferroalloys | 0.30 |
| Nickel | Balance |

The ferro alloys may be increased in amount to provide great fluidity and other desirable features up to the limits described herein as the maximum of the component element. But it has been determined that the lower percentages of carbon and flux components appear to provide the best general features for open arc welding.

The formulation shown above can be used to fill nickel tubes of various capacities so long as the nickel content of the filler alloying agent and the nickel tube combined are in the range of 97.40% to 98.70% by weight with a preference of 98.30%.

Commercially pure nickel strip of over 99% nickel is an ideal material for forming the tube walls according to the invention. Such strip is available with the following chemical constituents expressed in weight percents: Ni (min.) 99.0, Cu (max.) 0.25, Fe (max.) 0.24, Mn (max.) 0.35, C (max.) 0.15, Si (max.) 0.35, S (max.) 0.01. Low carbon strip has the following general chemical constituents expressed in weight percents: Ni (min.) 99.0, Cu (max.) 0.25, Fe (max.) 0.40, Mn (max.) 0.35, C (max.) 0.02, Si (max.) 0.35, S (max.) 0.01. A typical analysis of useful nickel strip is Ni 99.4, C 0.1, Cu 0.1, Fe 0.15, Mn 0.2, Si 0.05, expressed in weight percents. The strip is procured by specifications as to width and thickness within close tolerances. The temper of the strip is specified according to the amount of working due to rolling, forming and drawing it will receive so that the finished tubular product is not strained to the point where stresses due to working cause undue twisting deformation or other features which would interfere with proper feeding through standard semi-automatic or automatic wire feeders. Surface finish may also be specified.

It is important that the nickel strip be low in sulphur and other elements known to be deleterious to welded joints where pure nickel is used.

The nickel strip is run through a roll-forming machine whereby it is shaped into a tube by means of several sets of rolls. The first operation forms the strip into a shallow trough; the second operation deepens the trough. The third operation laps the sides of the trough over in the shape of a lap seem tube and crimps the tube tightly. The remaining operations serve to reduce the size of the tube and to squeeze it tighter.

Between the second and third operation the U-shaped strip passes a moving endless belt onto which alloy mixtures from a hopper or other suitable container are metered at a constant rate to form a continuous column of material which drops off the end of the belt into the half-formed tube. These additions are controlled precisely so that the amount of material being fed into the tube bears a definite ratio to the nickel strip.

To adjust the surface tension, small quantities of fluxing agent to the amount 0.50% to 6% of the total electrode weight within the tube, are used. This serves to quiet the arc, reduces the spatter and controls the surface tension so that sound, well formed deposits may be made with ease.

The relatively small ratio of the flux content of this invention to the electrode as a whole remarkably provides suitable ionization to the arc, control of bead conformation and protects the weld metal from harmful oxidation, while forming deposits of essentially pure nickel of great soundness and freedom from porosity, pinholes, cracks, checks and other adverse faults which would render the deposit unusable.

Since the amount of these slag forming ingredients is limited, no full covering slag may result, but the bead as deposited acquires a thin film of liquid flux in the heat of the arc which solidifies as a very thin, tightly adhering layer upon cooling. The thin film does not detract from the usefulness of the deposited nickel in joining and overlaying applications. It does protect the deposited metal against deep oxidation and inclusions of oxide and permits the deposition of very sound, dense deposits of nickel. Multiple pass deposits can be made to any extent with automatic or semi-automatic welding equipment.

Suitable fluxing agents include the conventional agents known in the art. As illustrative examples there may be mentioned carbonates, silicates, fluorides and fluro-silicates of the alkali metals and alkaline earths as well as alloying metals, metal compounds and ferro alloys. Combinations of two or more of these compounds serve better than any one alone. The compounds of barium, aluminum, magnesium, strontium and boron alone or in selected combinations also produce marked improvements when incorporated as fluxing agents.

A fluoride of the alkaline earth group, such as Cryolite, will produce a definite improvement in arc stability and bead conformation. But greater improvement is achieved if one or more carbonates of the alkaline earth group is added with the fluoride. As an example of a flux composition which produces exceptionally excellent open arc weldability the following composition expressed in weight percent has been found to be most effective:

| Material: | Percent |
|---|---|
| Cryolite | 20-50 |
| Strontium carbonate | 25-60 |
| Barium carbonate | 25-60 | with the preferred range as follows:

| Material: | Percent |
|---|---|
| Cryolite | 25-35 |
| Strontium carbonate | 30-40 |
| Barium carbonate | 30-40 | as an example:

| Material: | Percent |
|---|---|
| Cryolite | 30 |
| Strontium carbonate | 35 |
| Barium carbonate | 35 |

The amount of this flux when added to the filler composition for charging into the tube should be kept between the general limits of 0.5-6%, more particularly in the range of 0.60% to 1.80%, with the median range of 0.80% to 1.20% for best results.

A flux percentage of 0.90% has been found most satisfactory.

When added to the filler material, the weight of the flux addition should displace an equal weight of nickel filler in order to maintain the exact proportions of overall alloying elements.

Another example of flux composition that performs very well with the product of our invention, particularly on cast iron parent metal applications is as follows:

| Material: | Weight percent |
|---|---|
| Carbon | 10-15 |
| Silicon as ferro silicon | 2-6 |
| Manganese as ferro manganese | 3.5-7.0 |
| Titanium as ferro titanium | 3.5-7.0 |
| Iron as above ferro alloys | 2.5-6.3 |
| Calcium carbonate | 20-75 |
| Calcium fluoride | 20-40 | with the preference to:

| Material: | Weight percent |
|---|---|
| Carbon | 12-13 |
| Silicon as ferro silicon | 3-5 |
| Manganese as ferro manganese | 4-6 |
| Titanium as ferro titanium | 2-4 |
| Iron as above ferro alloys | 6-10 |
| Calcium carbonate | 34-38 |
| Calcium fluoride | 30-34 | as an example:

| Material: | Weight percent |
|---|---|
| Carbon | 12 |
| Ferro silicon | 8 |
| Ferro manganese | 6 |
| Ferro titanium | 5 |
| Calcium carbonate | 37 |
| Calcium fluoride | 32 |
| Total | 100 |

It is, of course, understood that the above mentioned agents alone or in specified combination are merely illustrative and other fluxing agents alone or in combination may be used in place thereof.

The mixture is compounded of metals, alloys, and fluxing agents calculated to contribute to the chemistry of the weld metal deposited by the electric arc and to provide a weld metal chemistry of closely controlled elements within very limited ranges.

With the process of this invention it is possible to manufacture a nickel electrode of such purity as to deposit 97.5-98.0% pure nickel if undiluted by base metal other than nickel. Such electrodes are extremely useful in welding by joining cast iron or steel parts, for the repair or fabrication of such parts and for overlaying these parts.

While the deposited metal is essentially nickel of high purity, minor additions of other elements are permissible as for example:

Carbon up to about 0.50%.
Silicon up to about 0.50%.
Manganese less than 1.00%.
Iron up to 2.50%.

Carbon is soluble in nickel at molten temperatures up to about 5%, but is retained to about .03%. Therefore the rejected carbon is in the form of free graphite. The presence of graphite in the welding electrode serves to form a shielding gas by combining with the atmospheric oxygen as $CO_2$. This reaction in itself aids the deposition of sound deposits, but if the carbon is too high over 0.50% and excessive, graphite is a hindrance to the welding application because it coats the globules of molten metal and prevents the deposition of well formed beads.

Too much carbon will make deposited beads heavy with poor wettability to the extent that prevents the welder from shaping the deposit properly and cause unusually high spatter.

Since the electrode designed to deposit high purity nickel can be manufactured with only a small amount of accessory elements and a minimum of fluxing ingredients, the tube is rolled out of nickel strip of a minimum thickness of .012″ or of thicker strip up to a maximum thickness of approximately .020″ thickness. Thus with high percentages of filler it is necessary to add high purity nickel in the form of powder, shot or wire to fill the tube so that maximum tightness is achieved to form a wire of high density and soundness with great uniformity. When thicker strips are used, the amount of added nickel becomes lower.

As suitable nickel for filler material there may be used the high purity strip nickel mentioned earlier. Also, there may be used other commercially available forms such as nickel conforming to the chemical analysis expressed in weight percents as follows:

| Constituents | Weight Percent | | |
|---|---|---|---|
| | Electrolytic | "X" Shot | "A" Shot |
| Ni (min.) | 99.5 | 98.9 | 97.75 |
| S (max.) | 0.02 | 0.05 | 0.070 |
| C (max.) | 0.10 | 0.25 | 0.75 |
| Fe (max.) | 0.25 | 0.60 | 0.90 |

Casting nickel may further be used and corresponds to the following constituents in percent by weight: Ni 97.0, Cu 0.3, Fe 0.25, Mn 0.5, Si 1.6, C 0.5.

Generally speaking the over all purity of the total nickel content of the combined tube and filler alloying agents should average above 97 percent so that nickel of the highest purity may be deposited.

Adding the basic nickel ingredient in the form of wire is a unique manner in which to construct a tubular electrode when it is desired to add fluxes and deoxidizers or alloying elements to pure metal electrodes by incorporating them as internal additions in a tube. The wire is easily fed into the tube while it is being formed from the strip and with strip of controlled size and wire of uniform size, the weight ratio between filler materials and basic metal is assured to be of the greatest consistency. A small amount of the basic nickel powder may be added to adjust the percentage filler is desirable.

The foregoing description applies to continuous tubular electrodes for automatic or semi-automatic welding, particularly by the open arc process.

The continuous electrode may also be used for submerged arc welding with commercial flux compositions. We have found that the electrode of our invention can be used for making deposits under submerged arc conditions, without varying the filler content of the electrode, to produce exceptionally sound and well-formed beads.

The tubular electrode may also be cut into short lengths as desired and coated with fluxing compositions for manual coated electrode application designed to produce light or heavy covering slags. The bare wire may also be used in suitable lengths for application with inert shielding gases such as argon or helium and applied by the Tungsten Inert Gas method or the Metal Inert Gas process (TIG and MIG).

It is important to note that the tubular electrode of our invention may be easily and conveniently altered to deposit a wide range of chemistries by means of varying the additions to the filler material contained within the tube.

What is claimed is:

1. A tubular electrode consisting essentially of a thin tube of nickel having a wall thickness ranging approximately from 0.012 to 0.020 inch; filler alloying agents within said tube consisting essentially of the following constituents in the indicated ranges of percentages by weight of said combined filler alloying agents and tube:

| Constituents: | Percent by weight |
|---|---|
| Carbon | 0.70–1.10 |
| Silicon as ferrosilicon | 0.15–0.40 |
| Manganese as ferromanganese | 0.25–0.50 |
| Iron as above ferroalloys | 0.20–0.60 |
| Nickel | Balance | and filler fluxing agents within said tube ranging approximately from 0.5–6% by weight of the overall electrode, the nickel content of the combined filler alloying agents and tube ranging approximately from 97.4 to 98.7% by weight thereof, said tube ranging from 54–62% by weight of a cross sectional unit of said combined filler alloying agents and tube, said filler alloying agents ranging from 38–64% by weight of said cross sectional unit and said combined filler alloying agents and tube ranging approximately from 94–99.5% by weight of said overall electrode.

2. A tubular electrode according to claim 1 wherein the filler alloying agents consist essentially of the following constituents in the indicated ranges of percentages by weight of said combined filler alloying agents and tube:

| Constituents: | Percent by weight |
|---|---|
| Carbon | 0.90 |
| Silicon as ferrosilicon | 0.20 |
| Manganese as ferromanganese | 0.30 |
| Iron as above ferroalloys | 0.30 |
| Nickel | Balance |

3. A tubular electrode according to claim 1 wherein the nickel content of the combined filler alloying agents and tube is 98.3 percent.

4. A tubular electrode according to claim 1 wherein the filler fluxing agents consist essentially of the following constituents in the indicated ranges of percentages by weight based on total fluxing agents:

| Constituents: | Percent |
|---|---|
| Cryolite | 20–50 |
| Strontium carbonate | 25–60 |
| Barium carbonate | 25–60 |

5. A tubular electrode according to claim 1 wherein the filler fluxing agents consist essentially of the following constituents in the indicated ranges of percentages by weight based on total fluxing agents:

| Constituents: | Percent |
|---|---|
| Carbon | 10–15 |
| Silicon as ferrosilicon | 2–6 |
| Manganese as ferromanganese | 3.5–7.0 |
| Titanium as ferrotitanium | 3.5–7.0 |
| Iron as above ferroalloys | 2.5–6.3 |
| Calcium carbonate | 20–75 |
| Calcium fluoride | 20–40 |

6. A tubular electrode according to claim 1 wherein the nickel contained in the tube and filler alloying agent is of a purity averaging at least 97 percent.

References Cited

UNITED STATES PATENTS

| 2,848,596 | 8/1958 | Strohmeier et al. | 219—146 |
| 2,862,844 | 12/1958 | Luedeman | 219—146 |
| 3,033,977 | 5/1962 | Quaas | 219—146 |

RICHARD M. WOOD, *Primary Examiner.*

B. A. STEIN, *Assistant Examiner.*